United States Patent [19]
Hinze

[11] Patent Number: 5,743,157
[45] Date of Patent: Apr. 28, 1998

[54] METHOD FOR MAKING A STRENGTHENED SPINNER HAVING INTEGRALLY FORMED RIBS

[75] Inventor: Jay W. Hinze, Newark, Ohio

[73] Assignee: Owens-Corning Fiberglas Technology, Inc., Summit, Ill.

[21] Appl. No.: 692,898

[22] Filed: Jul. 31, 1996

[51] Int. Cl.⁶ .................................................. B21K 5/20
[52] U.S. Cl. ........................................ 76/107.6; 65/516
[58] Field of Search ............................. 76/107.1, 107.4, 76/107.6; 148/653, 676; 65/513–518, 521–523

[56] References Cited

U.S. PATENT DOCUMENTS

| | | |
|---|---|---|
| 2,984,864 | 5/1961 | Levecque et al. |
| 3,282,078 | 11/1966 | Kaesemeyer. |
| 3,591,632 | 7/1971 | Benjamin. |
| 3,738,817 | 6/1973 | Benjamin. |
| 3,814,635 | 6/1974 | Cometto et al. |
| 3,991,598 | 11/1976 | Kraft. |
| 4,270,943 | 6/1981 | Riddell et al. |
| 4,288,236 | 9/1981 | Battigelli et al. |
| 4,294,783 | 10/1981 | Snowden. |
| 4,402,767 | 9/1983 | Hinze et al. |
| 4,877,435 | 10/1989 | Haeberle et al. |
| 4,948,409 | 8/1990 | Chenoweth et al. |
| 5,015,278 | 5/1991 | Lee. |
| 5,085,679 | 2/1992 | Hinze et al. |
| 5,384,949 | 1/1995 | Wodrich et al. |
| 5,460,498 | 10/1995 | Steel et al. ................. 65/516 X |

FOREIGN PATENT DOCUMENTS

| | | |
|---|---|---|
| 0568779 | 11/1993 | Germany. |
| 5-76982 | 3/1993 | Japan. |
| 01754 | 2/1993 | WIPO. |

*Primary Examiner*—Douglas D. Watts
*Attorney, Agent, or Firm*—C. Michael Gegenheimer; Curtis B. Brueske

[57] ABSTRACT

A method of forming a spinner for centrifuging fibers from molten material is disclosed. A dispersion strengthened metal is warm worked at a temperature above the minimum warm working temperature and below the recrystallization temperature of the metal to form a spinner having an annular peripheral wall and a plurality of ribs formed integrally with the peripheral wall and extending radially inwardly therefrom. The spinner is heat treated to recrystallize the metal to a coarse grain structure, and a plurality of fiber-forming orifices are formed in the peripheral wall.

20 Claims, 4 Drawing Sheets

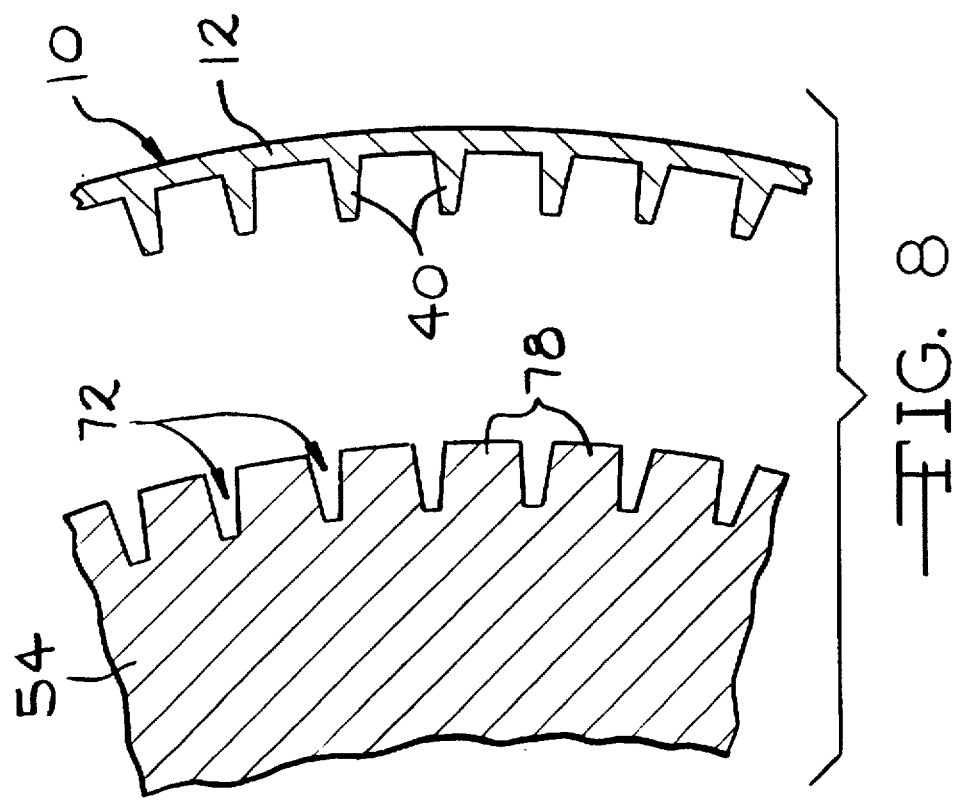
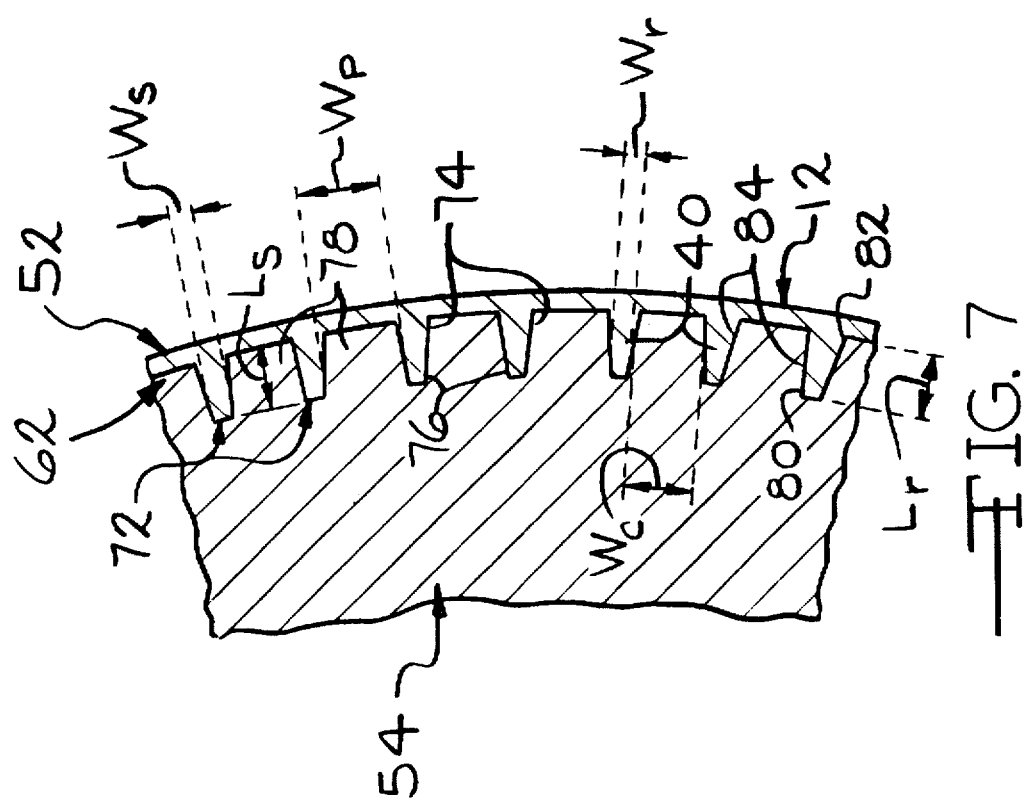

1

METHOD FOR MAKING A STRENGTHENED SPINNER HAVING INTEGRALLY FORMED RIBS

TECHNICAL FIELD

This invention relates in general to the manufacture of spinners for producing thermoplastic fibers. More specifically, this invention relates to a method for making a spinner having integrally formed ribs from a dispersion strengthened metal.

BACKGROUND OF THE INVENTION

The production of thermoplastic fibers by means of a rotary process is well known. In general, a molten thermoplastic is fed into a spinner which revolves at high speeds. The spinner has a peripheral wall containing a multiplicity of orifices. The molten material passes by centrifugal force through the orifices of the peripheral wall and forms small diameter molten streams. The streams are directed downward toward a collection surface and cool to form fibers. As used herein, the term "thermoplastic" refers to a wide range of organic and inorganic materials and fibers, including polymers, glasses, rock, slag, basalt, and others.

Spinners for producing thermoplastic fibers are operated at elevated temperatures under high stress because of the high rotational speeds. Consequently, such spinners are commonly formed of a material having high rupture strength and high oxidation resistance at elevated temperatures. Spinners are usually formed by casting nickel or cobalt based alloys into a mold of the desired shape. These alloys work well, but there is still a need for materials with even greater strength at elevated temperatures.

U.S. Pat. No. 4,402,767 discloses the use of oxide dispersion strengthened metals in the manufacture of spinners having excellent high temperature strength. Such metals are a dispersion of small hard oxide particles, called dispersoids, in a metal matrix. This patent discloses spin forming a plate of an oxide dispersion strengthened metal into the shape of a spinner. U.S. Pat. No. 5,085,679 discloses ring rolling an oxide dispersion strengthened metal into the shape of a spinner. The spinners disclosed by these patents have a smooth peripheral wall for use in conventional fiberization processes.

A recent development in thermoplastic fiber technology is Miraflex® dual glass fibers sold by Owens-Corning. These fibers are formed of two different types of glass, and are particularly useful for making insulation products. A typical spinner for producing such fibers includes vertical ribs formed integrally with the peripheral wall. The ribs separate the two types of glass before they are combined in the orifices to make dual glass fibers.

A spinner having integrally formed ribs can be formed by casting nickel or cobalt based alloys. However, it would be desirable to manufacture a ribbed spinner from an oxide dispersion strengthened metal for increased strength at elevated temperatures. As described above, U.S. Pat. No. 4,402,767 teaches forming an oxide dispersion strengthened metal into a spinner with a smooth peripheral wall. To form a ribbed spinner from a smooth-walled spinner, the spinner would be spinformed with a thick peripheral wall, and then ribs machined into the inner surface of the peripheral wall. Such a manufacturing method would be costly because of extensive machining and a large amount of material waste, and could result in loss of material properties due to grain formation issues. Accordingly, it would be desirable to provide a method for making an oxide dispersion strengthened spinner having integrally formed ribs without requiring extensive machining.

SUMMARY OF THE INVENTION

The above object as well as other objects not specifically enumerated are achieved by a method of forming a spinner for centrifuging fibers from molten material according to the present invention. In the method of the present invention, a dispersion strengthened metal is warm worked at a temperature above the minimum warm working temperature and below the recrystallization temperature of the metal to form a spinner having an annular peripheral wall and a plurality of ribs formed integrally with the peripheral wall and extending radially inwardly therefrom. The spinner is heat treated to recrystallize the metal to a coarse grain structure, and a plurality of fiber-forming orifices are formed in the peripheral wall.

BRIEF DESCRIPTION OF THE DRAWINGS

FIG. 7 is a cross-sectional view of a portion of the spinner and mandrel taken along line 7—7 of FIG. 6.

FIG. 8 is a view as in FIG. 7 with the spinner separated from the mandrel.

DETAILED DESCRIPTION

Figure 1:
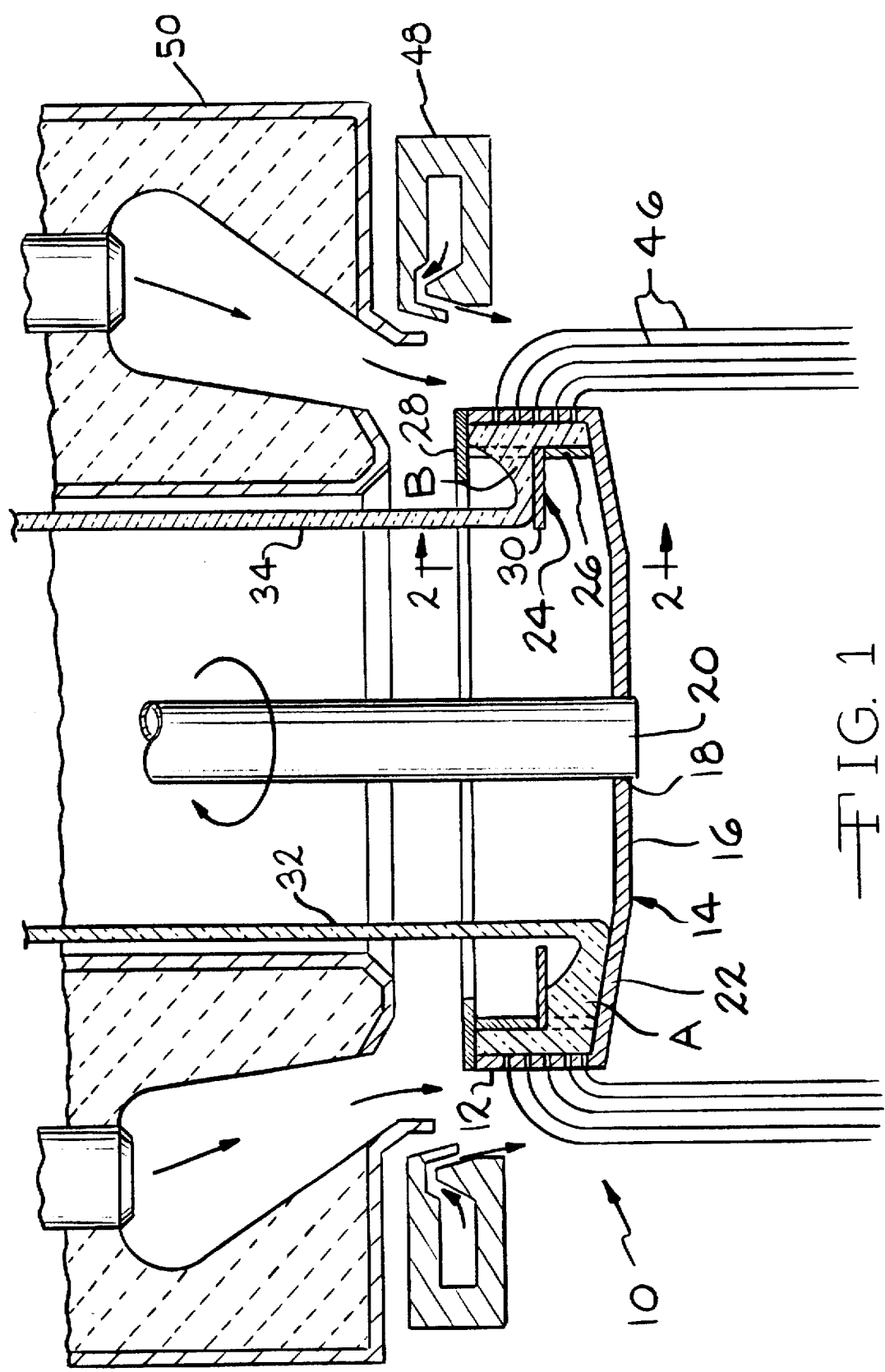
FIG. 1 is a cross-sectional view in elevation of a spinner manufactured in accordance with this invention.
Figure 2:
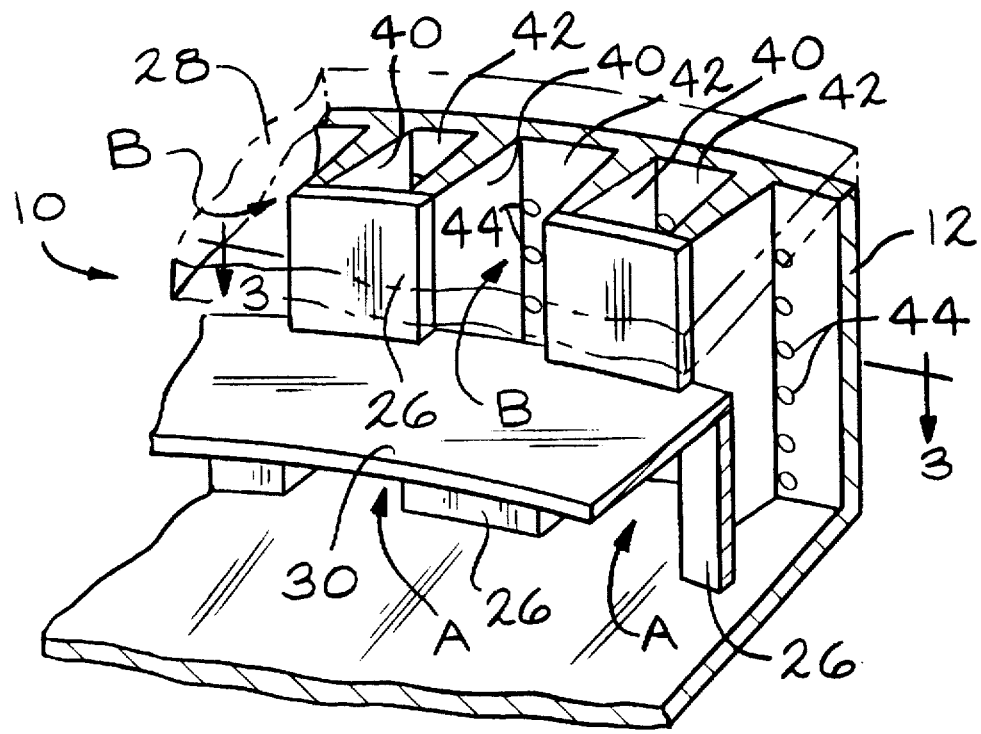
FIG. 2 is a schematic view in perspective of a portion of the spinner taken along line 2—2 of FIG. 1.
Figure 3:
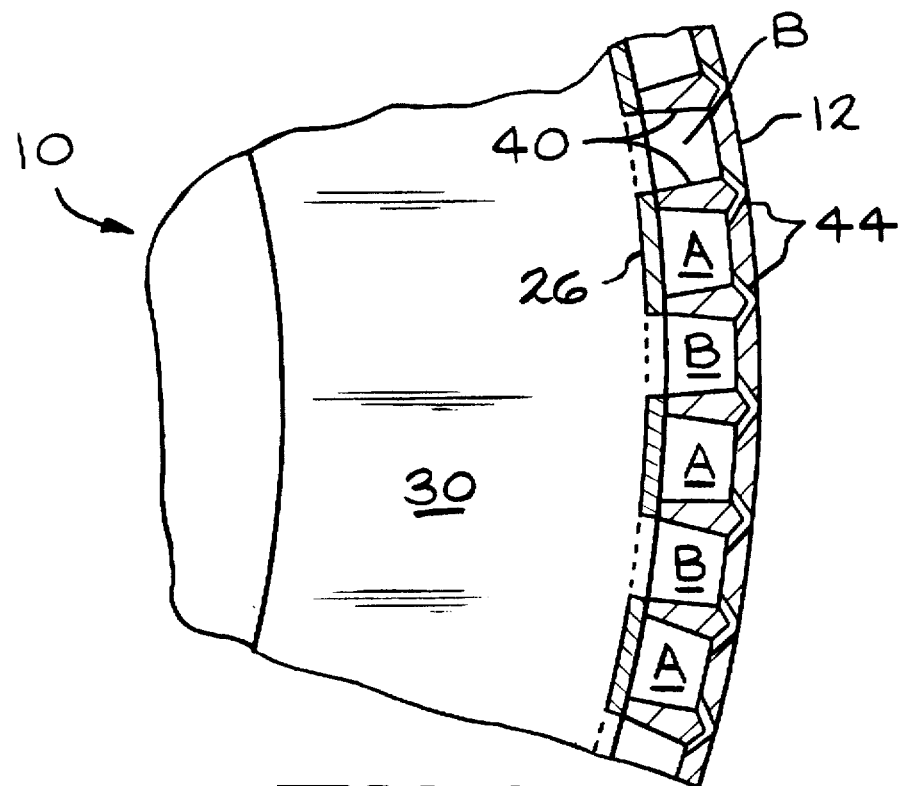
FIG. 3 is a cross-sectional view of a portion of the spinner taken along line 3—3 of FIG. 2.

Referring now to the drawings, FIGS. 1 through 3 illustrate a generally annular spinner 10 suitable for making dual thermoplastic fibers by a rotary process. The method of the present invention for making the spinner will be described below. The spinner includes a generally annular peripheral wall 12, and a generally circular bottom wall 14 formed integrally with the peripheral wall. The bottom wall includes an inner portion 16 which is generally perpendicular to the peripheral wall, and which has a circular opening 18 formed therethrough. The spinner is rotated on any suitable means, such as a spindle 20 secured inside the opening. An outer portion 22 of the bottom wall extends between the inner portion and the peripheral wall, at a slight angle downward from perpendicular with the peripheral wall. Preferably the interior of the spinner is heated by any heating means (not shown) such as by blowing in hot air or other gas.

An insert 24 is positioned inside the spinner. The insert includes a vertical interior wall 26 which is generally annular and positioned radially inwardly from the peripheral wall. A generally annular, horizontal upper flange 28 extends between the upper edges of the interior wall and the peripheral wall. A generally annular, horizontal center flange 30 extends radially inwardly from the interior wall. The insert is secured to the spinner by welding or other suitable means. The upper flange can also be a separate piece which is secured in place after positioning the insert inside the spinner.

The interior of the spinner is supplied with two separate streams of molten thermoplastic material, a first stream 32 containing thermoplastic material A and a second stream 34 containing thermoplastic material B. Material A in the first stream drops directly onto the bottom wall 14 and flows outwardly due to centrifugal force toward the peripheral wall to form a head of material A as shown. Material B in the second stream drops closer to the peripheral wall than the first stream. As a result, the B material in the second stream is intercepted by the center flange 30 before it can reach the bottom wall. Thus, a build-up or head of material B is formed above the center flange as shown.

As shown in FIG. 2, a series of vertical ribs 40 are formed integrally with the peripheral wall 12 of the spinner 10, and extend radially inwardly therefrom. The ribs are positioned between the peripheral wall and the interior wall 26, and divide that space into a series of generally vertically-aligned compartments 42 which run substantially the entire height of the peripheral wall. It can be seen that the center flange 30, interior wall 26, and ribs 40 together comprise a divider for directing the molten thermoplastic materials A and B into alternating adjacent compartments so that every other compartment contains molten material A while the remaining compartments contain molten material B.

The peripheral wall is adapted with rows of orifices 44 which are positioned adjacent the radially outward end of the ribs 40. As best seen in FIG. 3, the orifices are in the shape of a "V", with one end or leg leading into a compartment containing molten material A and one leg leading into a compartment containing molten material B. The flows of both molten material A and molten material B join and emerge from the orifice as a single dual thermoplastic fiber 46 (shown in FIG. 1).

In an alternate embodiment (not shown), the V-shaped orifices are replaced by straight orifices that have a width slightly greater than the width of the ribs. The orifices thereby enable a flow of both molten material A and molten material B to emerge from the orifice as a single dual thermoplastic fiber. Other configurations of orifices can also be used to form dual thermoplastic fibers.

As the dual thermoplastic fibers 46 emerge from the spinner 10, annular blower 48 is positioned to direct the fibers downwardly for collection. Optionally the annular blower can use induced air to further attenuate the fibers. A heating means such as annular hot air supply 50 can optionally be positioned outside the spinner to heat either the spinner or the fibers, to facilitate the fiber attenuation and maintain the temperature of the spinner at the level for optimum centrifugation of the fibers.

In accordance with this invention, the spinner for making the dual thermoplastic fibers is formed of a dispersion strengthened metal to provide excellent strength at elevated temperatures. The dispersion strengthened metals contemplated for use in the present invention are well known in the art, such as iron and nickel based oxide dispersion strengthened alloys, and mixtures thereof. These compositions include a dispersoid dispersed in a metal matrix. The dispersoid can be a metal oxide, metal carbide, metal silicide, metal nitride, metal boride, or a mixture thereof. Preferably, the dispersoid is a metal oxide, and most preferably the dispersoid is yttria or zirconia. The dispersoid is present in effective dispersion strengthening amounts. Usually, such amounts are within the range from about 0.1 percent to about 5.0 percent by volume of the dispersion strengthened metal.

The metal matrix of the dispersion strengthened metal may be any of a wide variety of compositions. The metal matrix is preferably an alloy, but it can also be a single metal. Examples of suitable metals for use in the metal matrix are nickel, chromium, cobalt and iron. Preferred matrices for spinners are nickel-chromium based alloys as well as nickel-chromium-cobalt based alloys. A particularly preferred dispersion strengthened metal is an alloy of about 70% nickel and about 30% chromium, by weight, with a dispersoid of yttria or zirconia at a level of about 3% by volume of the metal.

Suitable oxide dispersion strengthened metals are disclosed in U.S. Pat. Nos. 4,402,767, 3,814,635 and 4,877,435. In addition, exemplary compositions and techniques for forming oxide dispersion strengthened alloy powders are set forth in U.S. Pat. Nos. 3,591,362 and 3,738,817. The oxide dispersion strengthened alloy powders can be consolidated by canning them in containers and extruding at elevated temperatures. For example, the powders can be extruded by forcing them at about 1093° C. into a die to form a bar or plate. Alternatively, the powders can be consolidated by hot isostatic compacting or other suitable means. The bars or plates can be further processed by hot rolling, and then hot cross rolling into a plate of the desired thickness. The plate can be cut into suitable shapes by methods known in the art.

The present method includes the step of warm working the dispersion strengthened metal into the shape of the spinner. The term "warm working" means deformation of the metal at elevated temperatures below the metal's recrystallization temperature. Lower forces are required for deformation than in "cold working" which is usually conducted at room temperature. Warm working is distinguishable from "hot working" which means deformation above the recrystallization temperature of the metal. The "minimum warm working temperature" means the lowest temperature above which the metal can be deformed by a warm working method.

Any suitable warm working method can be used to form the dispersion strengthened metal into the shape of the spinner. A preferred method is spinning or spin forming. In this method, a plate or sheet of metal is formed into a shape by a combination of rotation and force. For example, the plate of metal can be spun on a mandrel and forced against the mandrel to take the shape thereof. The spin forming is preferably conducted in a power spinning machine, and more preferably a computer numeric controlled (CNC) power spinning machine. Examples of power spinning machines are disclosed in Metals Handbook, 9th Ed., Vol. 14, pp. 601–602, ASM International (1988). Another suitable warm working method is ring rolling. Other warm working methods are disclosed in Metals Handbook, 9th Ed., Vol. 14.

Figure 6:
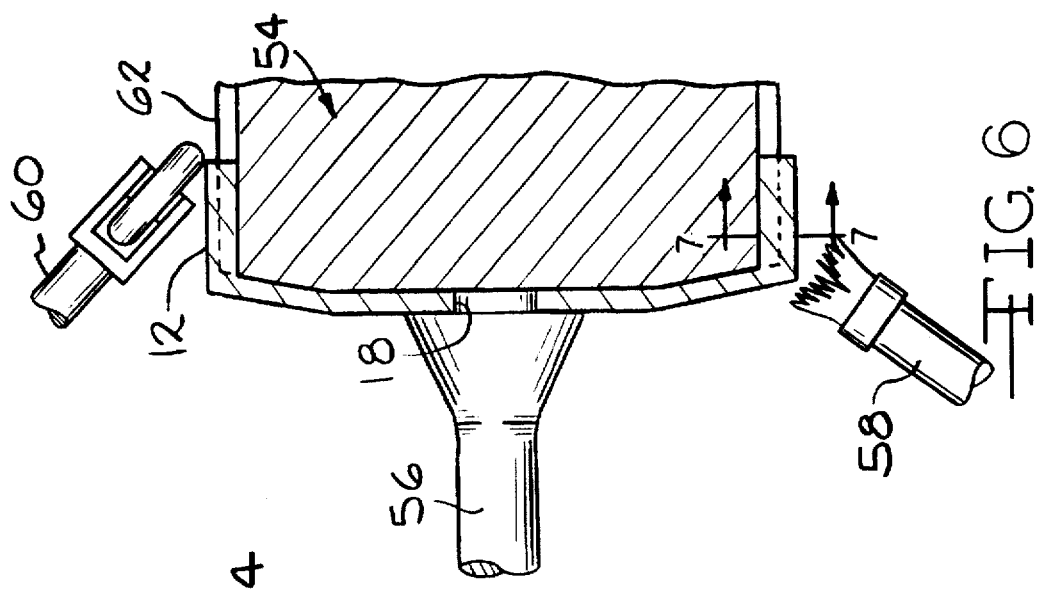
FIGS. 4 through 6 are schematic views of the steps of the spin forming method for manufacturing a spinner in accordance with this invention.
Figure 5:
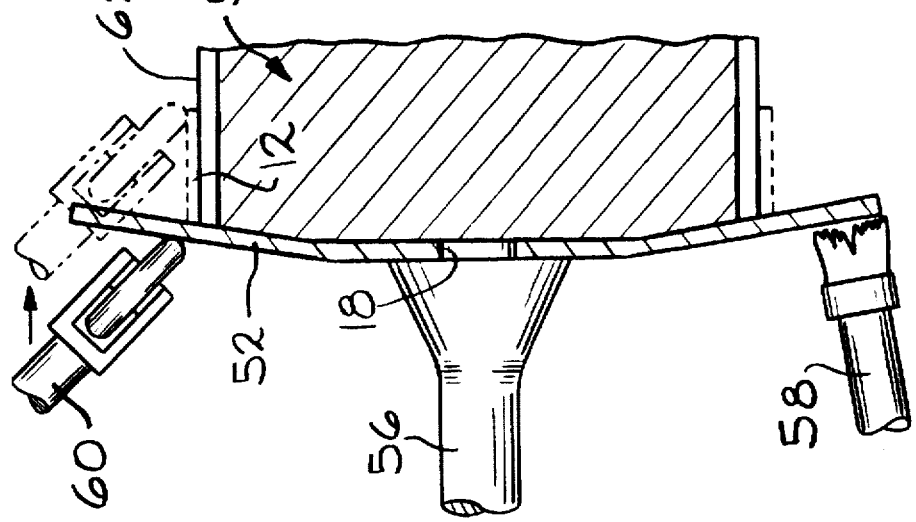
Figure 4:
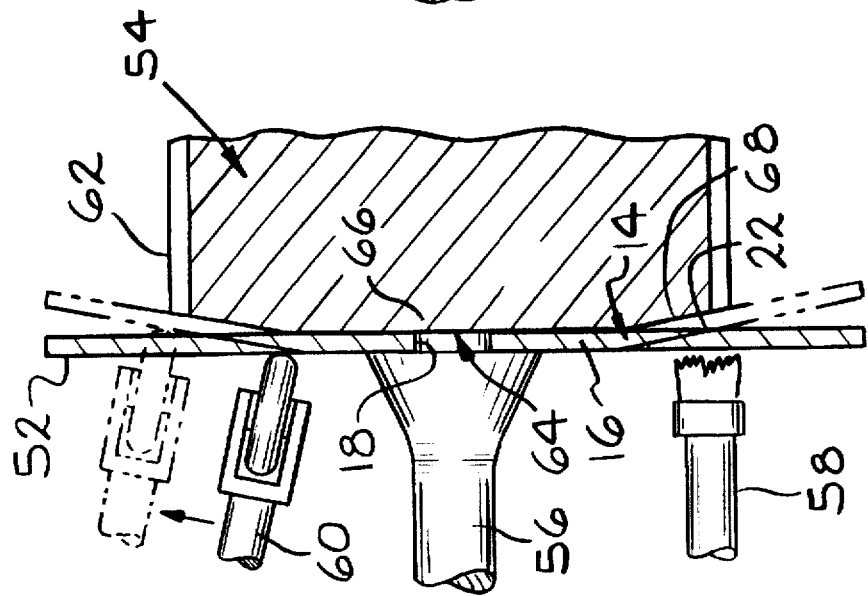

Preferably, the spinner is made by the spin forming method illustrated in FIGS. 4 through 6. A generally circular sheet or plate 52 of a dispersion strengthened metal is provided from any source, such as the extrusion and hot rolling process described above. A circular opening 18 is formed through the plate. The plate is positioned against a mandrel 54 which has been preheated to a temperature within the range from about 316° C. to about 427° C., and which retains its temperature throughout the warm working process. The plate is held in place against the mandrel by a tail stock 56. The mandrel and tail stock are rotated to spin the plate, for example at a rotation rate within the range from about 200 RPM to about 600 RPM, and preferably about 400 RPM.

The spinning plate is heated by one or more torches 58 or other means to a suitable temperature for spin forming. Suitable temperatures are above the minimum warm working temperature and below the recrystallization temperature and incipient melting point of the metal. Representative warm working temperatures are set forth in U.S. Pat. Nos.

4,402,767 and 4,877,435. Generally, the spin forming operation is carried out at a temperature within the range from about 538° C. to about 1205° C., and preferably from about 982° C. to about 1093° C.

A roller 60 moves radially outwardly and forces the spinning plate 52 against the spinning mandrel 54. Usually the roller makes multiple passes against the plate. In each pass, it moves radially outwardly against the plate, then moves off the plate and doubles back to its starting position. Each pass usually takes about 15–30 seconds. The plate is deformable at the warm working temperature. As a result, when the roller forces the plate against the mandrel, the plate takes the shape of the mandrel. The mandrel is generally cylindrical in shape with an outer, generally cylindrical surface 62 and a generally circular end surface 64. The end surface includes a radially extending central portion 66, and a peripheral portion 68 which extends at a slight inward angle from radial. Spin forming the plate against the end surface of the mandrel forms the inner portion 16 and outer portion 22 of the bottom wall 14 of the spinner.

As shown in FIGS. 5 and 6, the roller 60 moves longitudinally to force the plate against the outer cylindrical surface 62 of the mandrel. Spin forming the plate against the outer cylindrical surface of the mandrel forms the peripheral wall 12 of the spinner.

As best seen in FIG. 7, the outer cylindrical surface 62 of the mandrel 54 has a plurality of longitudinally extending slots 72 formed therein. Preferably, the outer cylindrical surface has from about 100 to about 400 of these slots. The preferred slots have a generally frustoconical radial cross section which is slightly wider at the radially outward end 74 than the radially inward end 76. However, the slots can also have a straight cross section or other suitable shape.

Preferably, the slots have an average width Ws from about 0.1 cm to about 0.25 cm, and more preferably from about 0.13 cm to about 0.18 cm. The preferred slots have an average length Ls from about 0.25 cm to about 0.76 cm, and more preferably from about 0.3 cm to about 0.51 cm. If the slots are too long, it is difficult to economically manufacture a ribbed spinner by the present method.

A plurality of projections 78 are defined between the slots 72 on the outer cylindrical surface 62 of the mandrel 54. Preferably, the ratio of the average width Wp of the projections to the average width Ws of the slots is within the range from about 1:1 to about 3:1, and more preferably about 2:1.

The unrecrystallized dispersion strengthened metal of the plate 52 can be forced under pressure to flow into the slots 72 of the mandrel to form longitudinally extending ribs 40. At the same time, it is important that the plate not be subjected to excessive pressure which can cause the metal to crack and/or break. To achieve these ends, the plate is spin formed within a specific pressure range with an increased number of passes by the roller against the plate. Generally, the plate is spin formed onto the mandrel by the roller 60 under a hydraulic pressure within the range from about 0.7 MPa (megapascals) to about 7.0 MPa, preferably from about 1.4 MPa to about 4.2 MPa, and more preferably from about 2.1 MPa to about 3.5 MPa. Preferably, the roller makes from about 10 to about 20 passes against the plate, and more preferably from about 12 to about 16 passes. Each pass usually takes from about 15–30 seconds.

The resultant spinner has an annular peripheral wall 12 and a plurality of longitudinally extending ribs 40 formed integrally with the peripheral wall and extending radially inwardly therefrom. The spin forming process causes the peripheral wall and ribs to conform to the shape of the mandrel 54 and slots 72. Consequently, the preferred peripheral wall has from about 100 to about 400 ribs. The preferred ribs have a generally frustoconical radial cross section which is slightly narrower at the radially inward end 80 than the radially outward end 82. This shape of the ribs provides excellent strength and facilitates the removal of the spinner from the mandrel.

Preferably, the ribs have an average thickness or width Wr from about 0.1 cm to about 0.25 cm, and more preferably from about 0.13 cm to about 0.18 cm. The preferred ribs have an average length Lr from about 0.25 cm to about 0.76 cm, and more preferably from about 0.3 cm to about 0.51 cm. A plurality of channels 84 are defined between the ribs. Preferably, the ratio of the average width Wc of the channels to the average width Wr of the ribs is within the range from about 1:1 to about 3:1, and more preferably about 2:1.

As shown in FIG. 8, the spinner 10 is separated and removed from the mandrel 54. The separation of the spinner from the mandrel after warm working can be difficult. In a preferred embodiment of the invention, the spinner is cooled or allowed to cool after warm working to a temperature below about 260° C. Then the spinner is heated to a higher temperature than the mandrel. Preferably, the spinner is heated to a temperature at least about 500° C. higher than the temperature of the mandrel. For example, the spinner may be heated to a temperature of about 982° C. while the mandrel is maintained at a temperature of about 427° C. The resulting different thermal expansion of the spinner and mandrel facilitate their separation.

Another method to facilitate removal of the spinner from the mandrel is to form the ribs of the spinner with a vertical taper or draft (an angle from vertical) of between about 0.5° and about 1.5. Generally, the slots of the mandrel should also extend past the end of the spinner to allow easier removal of the spinner. An ejector plate can also be used for removal.

The next step is to heat treat the spinner above the recrystallization temperature of the metal but below its incipient melting point, to effect recrystallization of the metal. Generally, the spinner is heat treated at a temperature within the range from about 1260° C. to about 1371° C. for a time within the range from about 1 to 2 hours. This heat treatment results in a coarse grain structure for the high strength needed to withstand high stress at elevated temperatures. Generally, the coarse grain size will include grains in excess of 1 mm whereas the grain size is less than about 0.001 mm in the unrecrystallized state. The coarse grain structure commonly produced is generally a pancake type structure with a high grain aspect ratio, e.g., greater than at least about 3:1.

In the last step, a plurality of orifices are formed through the peripheral wall of the spinner by employing a conventional technique. Such techniques include laser drilling, electron beam drilling, electrical discharge machining and twist drilling. Some machining of the spinner can be conducted if needed. The spinner may then be used in a known manner to form dual thermoplastic fibers.

It should be understood that, although the spinner is disclosed herein as advantageously being used in the manufacture of dual thermoplastic fibers, the spinner may also be advantageously used to manufacture other types of thermoplastic fibers, including single thermoplastic fibers. In connection therewith, the orifices in the peripheral wall may be constructed to produce single thermoplastic fibers, and the ribs utilized for other functions, such as spinner strength enhancement or the maintenance of two separate molten thermoplastic reservoirs to form commingled fibrous products composed of two or more types of single thermoplastic fibers.

The principle and mode of operation of this invention have been described in its preferred embodiment. However, it should be noted that this invention may be practiced otherwise than as specifically illustrated and described without departing from its scope.

INDUSTRIAL APPLICABILITY

The invention can be useful in the manufacture of spinners for making dual thermoplastic fibers, which are particularly useful in thermal and acoustical insulation products, and they can also be used in many other applications including apparel products, filtration products, and in composite materials.

I claim:

1. A method of forming a spinner for centrifuging fibers from molten material comprising:

warm working a dispersion strengthened metal at a temperature above the minimum warm working temperature and below the recrystallization temperature of the metal, to form a spinner having an annular peripheral wall and a plurality of ribs formed integrally with the peripheral wall and extending radially inwardly therefrom;

heat treating the warm worked spinner to recrystallize the metal to a coarse grain structure; and forming a plurality of orifices through the peripheral wall.

2. The method of claim 1 wherein the warm working comprises a spin forming operation in which the metal is spun on a mandrel and forced against the mandrel to take the shape thereof.

3. The method of claim 2 wherein the metal is spin formed onto a mandrel having a cylindrical surface with slots formed therein to form the ribbed peripheral wall of the spinner.

4. The method of claim 3 wherein the metal is spin formed onto the mandrel by a roller under a hydraulic pressure within the range from about 0.7 MPa to about 7.0 MPa, the roller making from about 10 passes to about 20 passes against the metal.

5. The method of claim 4 wherein the metal is spin formed onto the mandrel by a roller under a hydraulic pressure within the range from about 1.4 MPa to about 4.2 MPa.

6. The method of claim 1 wherein the step of warm working includes warm working to form ribs having an average length within the range from about 0.25 cm to about 0.76 cm.

7. The method of claim 1 wherein the step of warm working includes warm working to form ribs having an average width within the range from about 0.1 cm to about 0.25 cm.

8. The method of claim 1 wherein the step of warm working includes warm working to form a plurality of channels between the ribs, such that the ratio of the average width of the channels to the average width of the ribs is within the range from about 1:1 to about 3:1.

9. The method of claim 1 wherein from about 200 to about 400 ribs are formed integrally with the peripheral wall.

10. The method of claim 1 wherein the step of warm working comprises spin forming the metal onto a mandrel having a cylindrical surface with slots formed therein, by making from about 10 to about 20 passes with a roller under a hydraulic pressure within the range from about 0.7 MPa to about 7.0 MPa against the metal to force the metal against the cylindrical surface, wherein the metal takes the shape of the cylindrical surface to form the ribbed peripheral wall of the spinner.

11. The method of claim 10 wherein the warm working comprises spin forming a generally circular plate of metal.

12. The method of claim 10 wherein the metal is selected from the group consisting of iron-based oxide dispersion strengthened alloys, nickel-based oxide dispersion strengthened alloys, and mixtures thereof.

13. The method of claim 10 further including removing the spinner from the mandrel after spin forming by cooling the spinner, then heating the spinner to a temperature at least about 500 C. higher than the temperature of the mandrel.

14. A method of forming a spinner for centrifuging fibers from molten material comprising:

spin forming a dispersion strengthened metal at a temperature above the minimum warm working temperature and below the recrystallization temperature of the metal, to form a spinner having an annular peripheral wall and a plurality of ribs formed integrally with the peripheral wall and extending radially inwardly therefrom, wherein the metal is spin formed onto a mandrel having a cylindrical surface with slots formed therein, the metal is forced against the cylindrical surface by a roller under a hydraulic pressure within the range from about 0.7 MPa to about 7.0 MPa, the roller making from about 10 passes to about 20 passes against the metal, wherein the metal takes the shape of the cylindrical surface to form the ribbed peripheral wall of the spinner;

heat treating the spin formed spinner to recrystallize the metal to a coarse grain structure; and forming a plurality of orifices through the peripheral wall.

15. The method of claim 10 wherein the step of warm working includes warm working to form a plurality of channels between the ribs, such that the ratio of the average width of the channels to the average width of the ribs is within the range from about 1:1 to about 3:1.

16. A method of forming a spinner for centrifuging fibers from molten material comprising:

spin forming a dispersion strengthened metal at a temperature above the minimum warm working temperature and below the recrystallization temperature of the metal, to form a spinner having an annular peripheral wall and a plurality of ribs formed integrally with the peripheral wall and extending radially inwardly therefrom, the ribs having a generally frustoconical radial cross section, wherein the metal is spin formed onto a mandrel having a cylindrical surface with slots formed therein, the metal is forced against the cylindrical surface by a roller under a hydraulic pressure within the range from about 0.7 MPa to about 7.0 MPa, the roller making from about 10 passes to about 20 passes against the metal, wherein the metal takes the shape of the cylindrical surface to form the ribbed peripheral wall of the spinner;

heat treating the spin formed spinner to recrystallize the metal to a coarse grain structure; and forming a plurality of orifices through the peripheral wall.

17. The method of claim 16 wherein the step of spin forming includes spin forming to form ribs having an average length within the range from about 0.25 cm to about 0.76 cm.

18. The method of claim 16 wherein the step of spin forming includes spin forming to form ribs having an average width within the range from about 0.1 cm to about 0.25 cm.

19. The method of claim 16 wherein the step of spin forming includes spin forming to form a plurality of channels between the ribs, such that the ratio of the average width of the channels to the average width of the ribs is within the range from about 1:1 to about 3:1.

20. The method of claim 16 wherein the metal is selected from the group consisting of iron-based oxide dispersion strengthened alloys, nickel-based oxide dispersion strengthened alloys, and mixtures thereof.

* * * * *